US008017561B2

(12) United States Patent
Nguyen

(10) Patent No.: US 8,017,561 B2
(45) Date of Patent: Sep. 13, 2011

(54) RESIN COMPOSITIONS AND METHODS OF USING SUCH RESIN COMPOSITIONS IN SUBTERRANEAN APPLICATIONS

(75) Inventor: Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 810 days.

(21) Appl. No.: 11/732,389

(22) Filed: Apr. 3, 2007

(65) Prior Publication Data
US 2007/0179065 A1 Aug. 2, 2007

Related U.S. Application Data

(62) Division of application No. 10/791,944, filed on Mar. 3, 2004, now Pat. No. 7,211,547.

(51) Int. Cl.
*C09K 8/588* (2006.01)
*C09K 8/22* (2006.01)
(52) U.S. Cl. ......... 507/221; 507/117; 507/118; 507/219
(58) Field of Classification Search .................. 507/221, 507/219, 118, 117
See application file for complete search history.

(56) References Cited

U.S. PATENT DOCUMENTS

| 2,238,671 A | 4/1941 | Woodhouse ............... 166/21 |
| 2,703,316 A | 3/1955 | Schneider ............... 260/78.3 |
| 2,869,642 A | 1/1959 | McKay et al. |
| 3,047,067 A | 7/1962 | Williams et al. .............. 166/33 |
| 3,052,298 A | 9/1962 | Malott |
| 3,070,165 A | 12/1962 | Stratton |
| 3,123,138 A | 3/1964 | Robichaux ............... 166/33 |
| 3,173,484 A | 3/1965 | Huitt et al. |
| 3,176,768 A | 4/1965 | Brandt et al. ............... 166/33 |
| 3,195,635 A | 7/1965 | Fast |
| 3,199,590 A | 8/1965 | Young ............... 166/33 |
| 3,272,650 A | 9/1966 | MacVittie ............... 134/7 |
| 3,297,086 A | 1/1967 | Spain ............... 166/33 |
| 3,302,719 A | 2/1967 | Fischer |
| 3,308,885 A | 3/1967 | Sandiford ............... 166/33 |
| 3,308,886 A | 3/1967 | Evans |
| 3,316,965 A | 5/1967 | Watanabe ............... 166/33 |
| 3,329,204 A | 7/1967 | Brieger |
| 3,336,980 A | 8/1967 | Rike |
| 3,364,995 A | 1/1968 | Atkins et al. |
| 3,366,178 A | 1/1968 | Malone et al. |
| 3,375,872 A | 4/1968 | McLaughlin et al. ............. 166/29 |
| 3,378,074 A | 4/1968 | Kiel |
| 3,404,735 A | 10/1968 | Young et al. ............... 166/33 |
| 3,415,320 A | 12/1968 | Young ............... 166/33 |
| 3,455,390 A | 7/1969 | Gallus |
| 3,478,824 A | 11/1969 | Hess et al. |
| 3,481,403 A | 12/1969 | Gidley et al. |
| 3,489,222 A | 1/1970 | Millhone et al. |
| 3,492,147 A | 1/1970 | Young et al. ............... 117/62.2 |
| 3,525,398 A | 8/1970 | Fisher |
| 3,565,176 A | 2/1971 | Clifford |
| 3,592,266 A | 7/1971 | Tinsley |
| 3,659,651 A | 5/1972 | Graham ............... 166/280 |
| 3,681,287 A | 8/1972 | Brown et al. ............... 260/67 |
| 3,708,013 A | 1/1973 | Dismukes ............... 166/276 |
| 3,709,298 A | 1/1973 | Pramann ............... 166/276 |
| 3,709,641 A | 1/1973 | Sarem |
| 3,741,308 A * | 6/1973 | Veley ............... 166/292 |
| 3,754,598 A | 8/1973 | Holloway, Jr. ............... 166/249 |
| 3,765,804 A | 10/1973 | Brandon ............... 417/540 |
| 3,768,564 A | 10/1973 | Know et al. ............... 166/307 |
| 3,769,070 A | 10/1973 | Schilt |
| 3,784,585 A | 1/1974 | Schmitt et al. ............... 260/861 |
| 3,819,525 A | 6/1974 | Hattenbrun ............... 252/132 |
| 3,828,854 A | 8/1974 | Templeton et al. ............ 166/307 |
| 3,842,911 A | 10/1974 | Know et al. ............... 166/307 |
| 3,850,247 A | 11/1974 | Tinsley |
| 3,854,533 A | 12/1974 | Gurley et al. ............... 166/276 |
| 3,857,444 A | 12/1974 | Copeland ............... 166/276 |
| 3,861,467 A * | 1/1975 | Harnsberger ............... 166/276 |
| 3,863,709 A | 2/1975 | Fitch ............... 165/1 |
| 3,868,998 A | 3/1975 | Lybarger et al. ............... 166/278 |
| 3,888,311 A | 6/1975 | Cooke, Jr. ............... 166/280 |
| 3,912,692 A | 10/1975 | Casey et al. ............... 260/78.3 |
| 3,933,205 A | 1/1976 | Kiel |

(Continued)

FOREIGN PATENT DOCUMENTS

CA 2063877 5/2003

(Continued)

OTHER PUBLICATIONS

U.S. Appl. No. 10/944,973, filed Sep. 20, 2004, Nguyen, et al.

(Continued)

*Primary Examiner* — Timothy J. Kugel
(74) *Attorney, Agent, or Firm* — Robert A. Kent; Baker Botts L.L.P.

(57) ABSTRACT

The present invention relates to curable, permeable resin compositions and methods of using such compositions. One embodiment of provides a method of creating a resin mass comprising the steps of combining a resin, a hardening agent, a hydrocarbon diluent, a silane coupling agent, a foaming agent, a compressible gas, and a degradable material to form a resin composition; placing the resin composition in a subterranean formation; and, allowing the resin to substantially cure and the degradable material to substantially degrade so as to form a permeable, hardened resin mass. Another embodiment of the present invention provides a resin composition useful in subterranean applications comprising a resin, a hardening agent, a hydrocarbon diluent, a silane coupling agent, a foaming agent, a compressible gas, and a degradable material.

23 Claims, No Drawings

U.S. PATENT DOCUMENTS

| | | | |
|---|---|---|---|
| 3,948,672 A | 4/1976 | Harnsberger | 106/90 |
| 3,955,993 A | 5/1976 | Curtice | 106/90 |
| 3,960,736 A | 6/1976 | Free et al. | 252/8.55 R |
| 4,000,781 A | 1/1977 | Knapp | |
| 4,008,763 A | 2/1977 | Lowe et al. | 166/253 |
| 4,015,995 A | 4/1977 | Hess | 106/287 |
| 4,018,285 A | 4/1977 | Watkins et al. | |
| 4,029,148 A | 6/1977 | Emery | 166/250.1 |
| 4,031,958 A | 6/1977 | Sandiford et al. | 166/270 |
| 4,042,032 A | 8/1977 | Anderson et al. | 166/276 |
| 4,060,988 A | 12/1977 | Arnold | |
| 4,068,718 A | 1/1978 | Cooke, Jr. et al. | |
| 4,070,865 A | 1/1978 | McLaughlin | 61/36 |
| 4,074,760 A | 2/1978 | Copeland et al. | 166/276 |
| 4,085,801 A | 4/1978 | Sifferman et al. | 166/295 |
| 4,085,802 A | 4/1978 | Sifferman et al. | |
| 4,089,437 A | 5/1978 | Chutter et al. | |
| 4,127,173 A | 11/1978 | Watkins et al. | 166/276 |
| 4,169,798 A | 10/1979 | DeMartino | 252/8.55 R |
| 4,172,066 A | 10/1979 | Zweigle et al. | 260/29.6 TA |
| 4,245,702 A | 1/1981 | Haafkens et al. | 166/307 |
| 4,247,430 A | 1/1981 | Constien | |
| 4,259,205 A | 3/1981 | Murphey | |
| 4,273,187 A | 6/1981 | Satter et al. | 166/250 |
| 4,291,766 A | 9/1981 | Davies et al. | 166/276 |
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstoesser et al. | 166/295 |
| 4,392,988 A | 7/1983 | Dobson et al. | |
| 4,399,866 A | 8/1983 | Dearth | |
| 4,415,805 A | 11/1983 | Fertl et al. | 250/260 |
| 4,428,427 A | 1/1984 | Friedman | |
| 4,439,489 A | 3/1984 | Johnson et al. | 428/404 |
| 4,441,556 A | 4/1984 | Powers et al. | |
| 4,443,347 A | 4/1984 | Underdown et al. | 252/8.55 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |
| 4,526,695 A | 7/1985 | Erbstosser et al. | 252/8.55 R |
| 4,527,627 A | 7/1985 | Graham et al. | 166/280 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | 252/8.55 R |
| 4,572,803 A | 2/1986 | Yamazoe et al. | 534/16 |
| 4,585,064 A | 4/1986 | Graham et al. | 166/280 |
| 4,649,998 A | 3/1987 | Friedman | 166/294 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,670,501 A | 6/1987 | Dymond et al. | |
| 4,675,140 A | 6/1987 | Sparks et al. | 264/4.3 |
| 4,681,165 A | 7/1987 | Bannister | |
| 4,683,954 A | 8/1987 | Walker et al. | 166/307 |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,772,646 A | 9/1988 | Harms et al. | |
| 4,777,200 A | 10/1988 | Dymond et al. | |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,070 A | 6/1989 | Sharp | |
| 4,842,072 A | 6/1989 | Friedman et al. | 166/295 |
| 4,846,118 A | 7/1989 | Slattery et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,875,525 A | 10/1989 | Mana | |
| 4,886,354 A | 12/1989 | Welch et al. | 356/70 |
| 4,888,240 A | 12/1989 | Graham et al. | 428/403 |
| 4,892,147 A | 1/1990 | Jennings, Jr. et al. | |
| 4,895,207 A | 1/1990 | Friedman et al. | 166/276 |
| 4,898,750 A | 2/1990 | Friedman et al. | |
| 4,903,770 A | 2/1990 | Friedman et al. | 166/288 |
| 4,921,576 A | 5/1990 | Hurd | |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,984,635 A | 1/1991 | Cullick et al. | |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,056,597 A | 10/1991 | Stowe, III et al. | |
| 5,082,056 A | 1/1992 | Tackett, Jr. | 166/295 |
| 5,095,987 A | 3/1992 | Weaver et al. | |
| 5,105,886 A | 4/1992 | Strubha et al. | 166/280 |
| 5,107,928 A | 4/1992 | Hilterhaus | 166/293 |
| 5,128,390 A | 7/1992 | Murphey et al. | 523/130 |
| 5,135,051 A | 8/1992 | Fracteau et al. | 166/104 |
| 5,142,023 A | 8/1992 | Gruber et al. | 528/354 |
| 5,152,836 A * | 10/1992 | Hirano et al. | 106/690 |
| 5,165,438 A | 11/1992 | Fracteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutts et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Caabai et al. | 521/63 |
| 5,232,961 A | 8/1993 | Murphey et al. | 523/414 |
| 5,238,068 A | 8/1993 | Fredickson | 166/307 |
| 5,244,362 A | 9/1993 | Conally et al. | |
| 5,247,059 A | 9/1993 | Gruber et al. | 528/354 |
| 5,249,627 A | 10/1993 | Harms et al. | |
| 5,249,628 A | 10/1993 | Surjaatmadja | 166/305 |
| 5,256,729 A | 10/1993 | Kutts et al. | 524/700 |
| 5,265,678 A | 11/1993 | Grundmann | |
| 5,273,115 A | 12/1993 | Spafford | 166/281 |
| 5,278,203 A | 1/1994 | Harms | |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrogues | 166/295 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmajda et al. | 175/67 |
| 5,363,916 A | 11/1994 | Himes et al. | 166/276 |
| 5,373,901 A | 12/1994 | Norman et al. | 166/300 |
| 5,377,756 A | 1/1995 | Northrop et al. | |
| 5,377,759 A | 1/1995 | Suries | 166/295 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,390,741 A | 2/1995 | Payton et al. | |
| 5,393,810 A | 2/1995 | Harris et al. | 524/56 |
| 5,396,957 A | 3/1995 | Surjaatmadja et al. | 166/308 |

| Patent No. | Date | Inventor(s) | Class |
|---|---|---|---|
| 5,402,846 A | 4/1995 | Jennings, Jr. et al. | 166/259 |
| 5,403,822 A | 4/1995 | Mueller et al. | |
| 5,420,174 A | 5/1995 | Dewprashad | |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,492,177 A | 2/1996 | Yeh et al. | |
| 5,492,178 A | 2/1996 | Nguyen et al. | 166/276 |
| 5,494,103 A | 2/1996 | Surjaatmadja et al. | 166/222 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |
| 5,551,513 A | 9/1996 | Suries et al. | 166/278 |
| 5,551,514 A | 9/1996 | Nelson et al. | 166/280 |
| 5,582,249 A | 12/1996 | Caveny et al. | 166/276 |
| 5,582,250 A | 12/1996 | Constein | 166/280 |
| 5,588,488 A | 12/1996 | Vijn et al. | 166/293 |
| 5,591,700 A | 1/1997 | Harris et al. | 507/204 |
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | |
| 5,604,184 A | 2/1997 | Ellis et al. | 507/117 |
| 5,604,186 A | 2/1997 | Hunt et al. | 507/204 |
| 5,609,207 A | 3/1997 | Dewprashad et al. | 166/276 |
| 5,620,049 A | 4/1997 | Gipson et al. | 166/248 |
| 5,639,806 A | 6/1997 | Johnson et al. | 523/208 |
| 5,663,123 A | 9/1997 | Goodhue, Jr. et al. | |
| 5,670,473 A | 9/1997 | Scepanski | 510/445 |
| 5,692,566 A | 12/1997 | Surles | 166/295 |
| 5,697,440 A | 12/1997 | Weaver et al. | 166/281 |
| 5,697,448 A | 12/1997 | Johnson | |
| 5,698,322 A | 12/1997 | Tsai et al. | 428/373 |
| 5,701,956 A | 12/1997 | Hardy et al. | |
| 5,712,314 A | 1/1998 | Surles et al. | 521/41 |
| 5,732,364 A | 3/1998 | Kalb et al. | 588/8 |
| 5,738,136 A | 4/1998 | Rosenberg | |
| 5,765,642 A | 6/1998 | Surjaatmadja | 166/297 |
| 5,775,425 A | 7/1998 | Weaver et al. | 166/276 |
| 5,782,300 A | 7/1998 | James et al. | 166/278 |
| 5,783,822 A | 7/1998 | Buchanan et al. | 250/259 |
| 5,787,986 A | 8/1998 | Weaver et al. | 166/280 |
| 5,791,415 A | 8/1998 | Nguyen et al. | 166/280 |
| 5,799,734 A | 9/1998 | Norman et al. | 166/278 |
| 5,806,593 A | 9/1998 | Suries | 166/270 |
| 5,830,987 A | 11/1998 | Smith | 528/332 |
| 5,833,000 A | 11/1998 | Weaver et al. | 166/276 |
| 5,833,361 A | 11/1998 | Funk | 366/80 |
| 5,836,391 A | 11/1998 | Jonasson et al. | 166/295 |
| 5,836,392 A | 11/1998 | Urlwin-Smith | 166/295 |
| 5,836,393 A | 11/1998 | Johnson | |
| 5,837,656 A | 11/1998 | Sinclair et al. | 507/220 |
| 5,837,785 A | 11/1998 | Kinsho et al. | 525/527 |
| 5,839,510 A | 11/1998 | Weaver et al. | 166/276 |
| 5,840,784 A | 11/1998 | Funkhouser et al. | 523/130 |
| 5,849,401 A | 12/1998 | El-Afandi et al. | 428/215 |
| 5,849,590 A | 12/1998 | Anderson, II et al. | 436/27 |
| 5,853,048 A | 12/1998 | Weaver et al. | 166/279 |
| 5,864,003 A | 1/1999 | Qureshi et al. | 528/141 |
| 5,865,936 A | 2/1999 | Edelman et al. | 156/310 |
| 5,871,049 A | 2/1999 | Weaver et al. | 166/276 |
| 5,873,413 A | 2/1999 | Chatterji et al. | 166/293 |
| 5,875,844 A | 3/1999 | Chatterji et al. | 166/293 |
| 5,875,845 A | 3/1999 | Chatterji et al. | 166/293 |
| 5,875,846 A | 3/1999 | Chatterji et al. | 166/293 |
| 5,893,383 A | 4/1999 | Facteau | 137/14 |
| 5,893,416 A | 4/1999 | Read | 166/304 |
| 5,901,789 A | 5/1999 | Donnelly et al. | |
| 5,908,073 A | 6/1999 | Nguyen et al. | 166/276 |
| 5,911,282 A | 6/1999 | Onan et al. | 175/72 |
| 5,916,933 A | 6/1999 | Johnson et al. | 523/208 |
| 5,921,317 A | 7/1999 | Dewprashad et al. | 166/208 |
| 5,924,488 A | 7/1999 | Nguyen et al. | 166/280 |
| 5,929,437 A | 7/1999 | Elliott et al. | 250/259 |
| 5,944,105 A | 8/1999 | Nguyen | 166/278 |
| 5,944,106 A | 8/1999 | Dalrymple et al. | |
| 5,945,387 A | 8/1999 | Chatterji et al. | 507/224 |
| 5,948,734 A | 9/1999 | Sinclair et al. | 507/219 |
| 5,957,204 A | 9/1999 | Chatterji et al. | 166/295 |
| 5,960,784 A | 10/1999 | Ryan | |
| 5,960,877 A | 10/1999 | Funkhouser | 166/270 |
| 5,960,878 A | 10/1999 | Nguyen et al. | |
| 5,960,880 A | 10/1999 | Nguyen et al. | 166/280 |
| 5,964,291 A | 10/1999 | Bourne et al. | 166/279 |
| 5,969,006 A | 10/1999 | Onan et al. | 523/166 |
| 5,969,823 A | 10/1999 | Wurz et al. | |
| 5,977,283 A | 11/1999 | Rossitto | 528/44 |
| 5,994,785 A | 11/1999 | Higuchi et al. | 527/789 |
| RE36,466 E | 12/1999 | Nelson et al. | 166/280 |
| 6,003,600 A | 12/1999 | Nguyen et al. | 166/281 |
| 6,004,400 A | 12/1999 | Bishop et al. | 134/2 |
| 6,006,835 A | 12/1999 | Onan et al. | 166/295 |
| 6,006,836 A | 12/1999 | Chatterji et al. | 166/295 |
| 6,012,524 A | 1/2000 | Chatterji et al. | 166/295 |
| 6,016,870 A | 1/2000 | Dewprashad et al. | 166/295 |
| 6,024,170 A | 2/2000 | McCabe et al. | 166/300 |
| 6,028,113 A | 2/2000 | Scepanski | 514/643 |
| 6,028,534 A | 2/2000 | Ciglenec et al. | 340/856.2 |
| 6,040,398 A | 3/2000 | Kinsho et al. | 525/527 |
| 6,047,772 A | 4/2000 | Weaver et al. | 166/276 |
| 6,059,034 A | 5/2000 | Rickards et al. | 166/280 |
| 6,059,035 A | 5/2000 | Chatterji et al. | 166/293 |
| 6,059,036 A | 5/2000 | Chatterji et al. | 166/294 |
| 6,063,738 A | 5/2000 | Chatterji et al. | |
| 6,068,055 A | 5/2000 | Chatterji et al. | 166/293 |
| 6,069,117 A | 5/2000 | Onan et al. | 507/202 |
| 6,070,667 A | 6/2000 | Gano | |
| 6,074,739 A | 6/2000 | Katagiri | 428/323 |
| 6,079,492 A | 6/2000 | Hoogteijling et al. | 166/276 |
| 6,098,711 A | 8/2000 | Chatterji et al. | 166/294 |
| 6,114,410 A | 9/2000 | Betzold | 523/130 |
| 6,123,871 A | 9/2000 | Carroll | 252/301.36 |
| 6,123,965 A | 9/2000 | Jacon et al. | 424/489 |
| 6,124,246 A | 9/2000 | Heathman et al. | 507/219 |
| 6,130,286 A | 10/2000 | Thomas et al. | 524/507 |
| 6,131,661 A | 10/2000 | Conner et al. | |
| 6,135,987 A | 10/2000 | Tsai et al. | 604/365 |
| 6,140,446 A | 10/2000 | Fujiki et al. | 528/15 |
| 6,143,698 A | 11/2000 | Murphey et al. | |
| 6,148,911 A | 11/2000 | Gipson et al. | 166/248 |
| 6,152,234 A | 11/2000 | Newhouse et al. | 166/403 |
| 6,162,766 A | 12/2000 | Muir et al. | 507/267 |
| 6,165,947 A | 12/2000 | Chang et al. | |
| 6,169,058 B1 | 1/2001 | Le et al. | 507/222 |
| 6,172,011 B1 | 1/2001 | Card et al. | 507/204 |
| 6,172,077 B1 | 1/2001 | Curtis et al. | 514/278 |
| 6,176,315 B1 | 1/2001 | Reddy et al. | 166/295 |
| 6,177,484 B1 | 1/2001 | Surles | 523/131 |
| 6,184,311 B1 | 2/2001 | O'Keefe et al. | 525/438 |
| 6,186,228 B1 | 2/2001 | Wegener et al. | |
| 6,187,834 B1 | 2/2001 | Thayer et al. | 522/15 |
| 6,187,839 B1 | 2/2001 | Eoff | 523/130 |
| 6,189,615 B1 | 2/2001 | Sydansk | 166/270 |
| 6,192,985 B1 | 2/2001 | Hinkel et al. | 166/280 |
| 6,192,986 B1 | 2/2001 | Urlwin-Smith | 166/295 |
| 6,196,317 B1 | 3/2001 | Hardy | 166/295 |
| 6,202,751 B1 | 3/2001 | Chatterji et al. | 166/276 |
| 6,209,643 B1 | 4/2001 | Nguyen et al. | 166/276 |
| 6,209,644 B1 | 4/2001 | Brunet | 166/297 |
| 6,209,646 B1 | 4/2001 | Reddy et al. | 166/300 |
| 6,210,471 B1 | 4/2001 | Craig | 106/31.08 |
| 6,214,773 B1 | 4/2001 | Harris et al. | 507/271 |
| 6,231,664 B1 | 5/2001 | Chatterji et al. | 106/724 |
| 6,234,251 B1 | 5/2001 | Chatterji et al. | 166/295 |
| 6,238,597 B1 | 5/2001 | Yim et al. | 252/512 |

| Patent | Kind | Date | Name | Class |
|---|---|---|---|---|
| 6,241,019 | B1 | 6/2001 | Davidson et al. | 166/249 |
| 6,242,390 | B1 | 6/2001 | Mitchell et al. | 507/211 |
| 6,244,344 | B1 | 6/2001 | Chatterji et al. | 166/295 |
| 6,257,335 | B1 | 7/2001 | Nguyen et al. | 166/280 |
| 6,260,622 | B1 | 7/2001 | Blok et al. | 166/305.1 |
| 6,271,181 | B1 | 8/2001 | Chatterji et al. | 507/219 |
| 6,274,650 | B1 | 8/2001 | Cui | 523/457 |
| 6,279,652 | B1 | 8/2001 | Chatterji et al. | 166/194 |
| 6,279,656 | B1 | 8/2001 | Sinclair et al. | 166/310 |
| 6,283,214 | B1 | 9/2001 | Guinot et al. | 166/297 |
| 6,302,207 | B1 | 10/2001 | Nguyen et al. | 166/276 |
| 6,306,998 | B1 | 10/2001 | Kimura et al. | 528/12 |
| 6,310,008 | B1 | 10/2001 | Rietjens | |
| 6,311,773 | B1 | 11/2001 | Todd et al. | 166/280 |
| 6,315,040 | B1 | 11/2001 | Donnelly | |
| 6,321,841 | B1 | 11/2001 | Eoff et al. | 166/291 |
| 6,323,307 | B1 | 11/2001 | Bigg et al. | 528/354 |
| 6,326,458 | B1 | 12/2001 | Gruber et al. | 528/354 |
| 6,328,105 | B1 | 12/2001 | Betzold | 166/280 |
| 6,328,106 | B1 | 12/2001 | Griffith et al. | 166/295 |
| 6,330,916 | B1 | 12/2001 | Rickards et al. | 166/280 |
| 6,330,917 | B2 | 12/2001 | Chatterji et al. | 166/295 |
| 6,342,467 | B1 | 1/2002 | Chang et al. | |
| 6,350,309 | B2 | 2/2002 | Chatterji et al. | 106/677 |
| 6,357,527 | B1 | 3/2002 | Norman et al. | 166/300 |
| 6,364,018 | B1 | 4/2002 | Brannon et al. | 166/280.2 |
| 6,364,945 | B1 | 4/2002 | Chatterji et al. | 106/677 |
| 6,367,165 | B1 | 4/2002 | Huttlin | 34/582 |
| 6,367,549 | B1 | 4/2002 | Chatterji et al. | 166/292 |
| 6,372,678 | B1 | 4/2002 | Youngsman et al. | 504/128 |
| 6,376,571 | B1 | 4/2002 | Chawla et al. | 522/64 |
| 6,387,986 | B1 | 5/2002 | Moradi-Araghi et al. | 523/211 |
| 6,390,195 | B1 | 5/2002 | Nguyen et al. | 166/276 |
| 6,394,181 | B2 | 5/2002 | Schnatzmeyer et al. | |
| 6,401,817 | B1 | 6/2002 | Griffith et al. | 166/295 |
| 6,405,796 | B1 | 6/2002 | Meyer et al. | |
| 6,405,797 | B2 | 6/2002 | Davidson et al. | 166/249 |
| 6,406,789 | B1 | 6/2002 | McDaniel et al. | 428/403 |
| 6,408,943 | B1 | 6/2002 | Schultz et al. | 166/285 |
| 6,415,509 | B1 | 7/2002 | Echols et al. | |
| 6,422,183 | B1 | 7/2002 | Kato | |
| 6,422,314 | B1 | 7/2002 | Todd et al. | 166/312 |
| 6,439,309 | B1 | 8/2002 | Matherly et al. | 166/276 |
| 6,439,310 | B1 | 8/2002 | Scott, III et al. | 166/308 |
| 6,440,255 | B1 | 8/2002 | Kohlhammer et al. | 156/283 |
| 6,446,727 | B1 | 9/2002 | Zemlak et al. | 166/308 |
| 6,448,206 | B1 | 9/2002 | Griffith et al. | 507/219 |
| 6,450,260 | B1 | 9/2002 | James et al. | 166/277 |
| 6,454,003 | B1 | 9/2002 | Chang et al. | 166/270 |
| 6,457,518 | B1 | 10/2002 | Castano-Mears et al. | |
| 6,458,885 | B1 | 10/2002 | Stengal et al. | 524/507 |
| 6,478,092 | B2 | 11/2002 | Voll et al. | |
| 6,485,947 | B1 | 11/2002 | Rajgarhia et al. | 435/139 |
| 6,488,091 | B1 | 12/2002 | Weaver et al. | 166/300 |
| 6,488,763 | B2 | 12/2002 | Brothers et al. | 106/692 |
| 6,494,263 | B2 | 12/2002 | Todd | 166/312 |
| 6,503,870 | B2 | 1/2003 | Griffith et al. | 507/219 |
| 6,508,305 | B1 | 1/2003 | Brannon et al. | 166/293 |
| 6,510,896 | B2 | 1/2003 | Bode et al. | |
| 6,520,255 | B2 | 2/2003 | Tolman et al. | |
| 6,527,051 | B1 | 3/2003 | Reddy et al. | 166/300 |
| 6,528,157 | B1 | 3/2003 | Hussain et al. | 428/325 |
| 6,531,427 | B1 | 3/2003 | Shuchart et al. | 507/267 |
| 6,534,449 | B1 | 3/2003 | Gilmour et al. | |
| 6,536,939 | B1 | 3/2003 | Blue | |
| 6,538,576 | B1 | 3/2003 | Schultz et al. | 340/859.6 |
| 6,543,545 | B1 | 4/2003 | Chatterji et al. | 166/381 |
| 6,550,959 | B2 | 4/2003 | Huber et al. | |
| 6,552,333 | B1 | 4/2003 | Storm et al. | 250/269.3 |
| 6,554,071 | B1 | 4/2003 | Reddy et al. | 166/293 |
| 6,555,507 | B2 | 4/2003 | Chatterji et al. | 507/219 |
| 6,569,814 | B1 | 5/2003 | Brady et al. | 507/201 |
| 6,582,819 | B2 | 6/2003 | McDaniel et al. | 428/402 |
| 6,588,926 | B2 | 7/2003 | Huber et al. | |
| 6,588,928 | B2 | 7/2003 | Huber et al. | |
| 6,593,402 | B2 | 7/2003 | Chatterji et al. | 524/7 |
| 6,599,863 | B1 | 7/2003 | Palmer et al. | 507/219 |
| 6,608,162 | B1 | 8/2003 | Chiu et al. | 528/129 |
| 6,609,578 | B2 | 8/2003 | Patel et al. | |
| 6,616,320 | B2 | 9/2003 | Huber et al. | 366/156.2 |
| 6,620,857 | B2 | 9/2003 | Valet | 522/42 |
| 6,626,241 | B2 | 9/2003 | Nguyen | 166/278 |
| 6,632,527 | B1 | 10/2003 | McDaniel et al. | 428/402 |
| 6,632,778 | B1 | 10/2003 | Ayoub et al. | 507/202 |
| 6,632,892 | B2 | 10/2003 | Rubinsztajn et al. | 525/476 |
| 6,642,309 | B2 | 11/2003 | Komitsu et al. | 525/100 |
| 6,648,501 | B2 | 11/2003 | Huber et al. | 366/301 |
| 6,659,179 | B2 | 12/2003 | Nguyen | 166/227 |
| 6,664,343 | B2 | 12/2003 | Narisawa et al. | 525/474 |
| 6,667,279 | B1 | 12/2003 | Hessert et al. | 507/225 |
| 6,668,926 | B2 | 12/2003 | Nguyen et al. | 166/280 |
| 6,669,771 | B2 | 12/2003 | Tokiwa et al. | 106/162.7 |
| 6,677,426 | B2 | 1/2004 | Noro et al. | |
| 6,681,856 | B1 | 1/2004 | Chatterji et al. | 166/294 |
| 6,686,328 | B1 | 2/2004 | Binder | 510/446 |
| 6,705,400 | B1 | 3/2004 | Nguyen et al. | 166/281 |
| 6,710,019 | B1 | 3/2004 | Sawdon et al. | 507/136 |
| 6,713,170 | B1 | 3/2004 | Kaneka et al. | 428/323 |
| 6,725,926 | B2 | 4/2004 | Nguyen et al. | 166/254.1 |
| 6,725,930 | B2 | 4/2004 | Boney et al. | |
| 6,725,931 | B2 | 4/2004 | Nguyen et al. | 166/280.2 |
| 6,729,404 | B2 | 5/2004 | Nguyen et al. | 166/280.2 |
| 6,729,405 | B2 | 5/2004 | DiLullo et al. | |
| 6,732,800 | B2 | 5/2004 | Acock et al. | 166/308 |
| 6,745,159 | B1 | 6/2004 | Todd et al. | 703/10 |
| 6,749,025 | B1 | 6/2004 | Brannon et al. | 166/305.1 |
| 6,763,888 | B1 | 7/2004 | Harris et al. | 166/305.1 |
| 6,764,981 | B1 | 7/2004 | Eoff et al. | 507/110 |
| 6,766,858 | B2 | 7/2004 | Nguyen et al. | 166/300 |
| 6,776,235 | B1 | 8/2004 | England | |
| 6,776,236 | B1 | 8/2004 | Nguyen | 166/279 |
| 6,832,650 | B2 | 12/2004 | Nguyen et al. | 166/279 |
| 6,832,655 | B2 | 12/2004 | Ravensbergen et al. | |
| 6,837,309 | B2 | 1/2005 | Boney et al. | |
| 6,851,474 | B2 | 2/2005 | Nguyen | 166/279 |
| 6,866,099 | B2 | 3/2005 | Nguyen | |
| 6,877,560 | B2 | 4/2005 | Nguyen et al. | 507/200 |
| 6,881,709 | B2 | 4/2005 | Nelson et al. | |
| 6,887,834 | B2 | 5/2005 | Nguyen et al. | 507/221 |
| 6,920,929 | B2 | 7/2005 | Bour | 166/280.2 |
| 6,962,200 | B2 | 11/2005 | Nguyen et al. | |
| 6,978,836 | B2 | 12/2005 | Nguyen et al. | 166/295 |
| 6,981,560 | B2 | 1/2006 | Nguyen et al. | 175/57 |
| 6,997,259 | B2 | 2/2006 | Nguyen | |
| 7,007,752 | B2 | 3/2006 | Reddy et al. | |
| 7,013,976 | B2 | 3/2006 | Nguyen et al. | 166/281 |
| 7,017,665 | B2 | 3/2006 | Nguyen et al. | 166/281 |
| 7,021,379 | B2 | 4/2006 | Nguyen et al. | 166/281 |
| 7,025,134 | B2 | 4/2006 | Byrd et al. | 166/90.1 |
| 7,028,774 | B2 | 4/2006 | Nguyen et al. | |
| 7,032,667 | B2 | 4/2006 | Nguyen et al. | |
| 7,036,589 | B2 | 5/2006 | Nguyen | 166/280.1 |
| 7,040,403 | B2 | 5/2006 | Nguyen et al. | |
| 7,044,220 | B2 | 5/2006 | Nguyen et al. | 166/279 |
| 7,059,406 | B2 | 6/2006 | Nguyen | 166/278 |
| 7,063,150 | B2 | 6/2006 | Slabaugh et al. | |
| 7,066,258 | B2 | 6/2006 | Justus et al. | 166/295 |
| 7,073,581 | B2 | 7/2006 | Nguyen et al. | 166/250.12 |
| 7,080,688 | B2 | 7/2006 | Todd et al. | |
| 7,081,439 | B2 | 7/2006 | Sullivan et al. | |
| 7,093,658 | B2 | 8/2006 | Chatterji et al. | |
| 7,104,325 | B2 | 9/2006 | Nguyen et al. | 166/295 |
| 7,114,560 | B2 | 10/2006 | Nguyen et al. | 166/249 |
| 7,114,570 | B2 | 10/2006 | Nguyen et al. | 166/295 |
| 7,117,942 | B2 | 10/2006 | Dalrymple et al. | |
| 7,131,491 | B2 | 11/2006 | Blauch et al. | 166/280.2 |
| 7,153,575 | B2 | 12/2006 | Anderson et al. | |
| 7,156,194 | B2 | 1/2007 | Nguyen | 175/72 |
| 7,178,596 | B2 | 2/2007 | Blauch et al. | |
| 7,204,311 | B2 | 4/2007 | Welton et al. | |
| 7,210,528 | B1 | 5/2007 | Brannon et al. | |
| 7,216,711 | B2 | 5/2007 | Nguyen et al. | |
| 7,252,146 | B2 | 8/2007 | Slabaugh et al. | |
| 7,261,156 | B2 | 8/2007 | Nguyen et al. | |
| 7,264,051 | B2 | 9/2007 | Nguyen et al. | |
| 7,264,052 | B2 | 9/2007 | Nguyen et al. | |
| 7,267,717 | B2 | 9/2007 | Watanabe et al. | |
| 7,273,099 | B2 | 9/2007 | East, Jr. et al. | |

| | | |
|---|---|---|
| 7,281,581 B2 | 10/2007 | Nguyen et al. |
| 7,306,037 B2 | 12/2007 | Nguyen et al. |
| 7,343,973 B2 | 3/2008 | Dusterhoft et al. |
| 2001/0016562 A1 | 8/2001 | Muir et al. ............. 507/201 |
| 2001/0052308 A1* | 12/2001 | Yamashita et al. ......... 106/728 |
| 2002/0036088 A1 | 3/2002 | Todd |
| 2002/0043370 A1 | 4/2002 | Poe ..................... 166/250.07 |
| 2002/0048676 A1 | 4/2002 | McDaniel et al. ......... 428/404 |
| 2002/0070020 A1 | 6/2002 | Nguyen .................... 166/295 |
| 2002/0104217 A1 | 8/2002 | Echols et al. |
| 2002/0160920 A1 | 10/2002 | Dawson et al. |
| 2002/0169085 A1 | 11/2002 | Miller et al. |
| 2002/0189808 A1 | 12/2002 | Nguyen et al. |
| 2003/0006036 A1 | 1/2003 | Malone et al. ......... 166/250.12 |
| 2003/0013871 A1 | 1/2003 | Mallon et al. |
| 2003/0060374 A1 | 3/2003 | Cooke, Jr. ............... 507/200 |
| 2003/0106690 A1 | 6/2003 | Boney et al. |
| 2003/0114314 A1 | 6/2003 | Ballard et al. ............. 507/100 |
| 2003/0114317 A1 | 6/2003 | Benton et al. |
| 2003/0130133 A1 | 7/2003 | Vollmer .................. 507/100 |
| 2003/0131999 A1 | 7/2003 | Nguyen et al. ............. 166/280 |
| 2003/0148893 A1 | 8/2003 | Lunghofer et al. ......... 507/200 |
| 2003/0186820 A1 | 10/2003 | Thesing ................... 507/200 |
| 2003/0188766 A1 | 10/2003 | Banerjee et al. ............... 134/7 |
| 2003/0188872 A1 | 10/2003 | Nguyen et al. ............. 166/308 |
| 2003/0196805 A1 | 10/2003 | Boney et al. ............... 166/280 |
| 2003/0205376 A1 | 11/2003 | Ayoub et al. ............. 166/254.2 |
| 2003/0230408 A1 | 12/2003 | Acock et al. .............. 166/297 |
| 2003/0230431 A1 | 12/2003 | Reddy et al. |
| 2003/0234103 A1 | 12/2003 | Lee et al. ................. 166/293 |
| 2004/0000402 A1 | 1/2004 | Nguyen et al. |
| 2004/0014607 A1 | 1/2004 | Sinclair et al. ............. 507/200 |
| 2004/0014608 A1 | 1/2004 | Nguyen et al. |
| 2004/0040706 A1 | 3/2004 | Hossaini et al. ............. 166/278 |
| 2004/0040708 A1 | 3/2004 | Stephenson et al. ........ 166/280.1 |
| 2004/0040712 A1 | 3/2004 | Ravi et al. |
| 2004/0040713 A1 | 3/2004 | Nguyen et al. |
| 2004/0043906 A1 | 3/2004 | Heath et al. |
| 2004/0045712 A1 | 3/2004 | Eoff et al. |
| 2004/0048752 A1 | 3/2004 | Nguyen et al. |
| 2004/0055747 A1 | 3/2004 | Lee ............................. 166/278 |
| 2004/0060702 A1 | 4/2004 | Kotlar et al. |
| 2004/0106525 A1 | 6/2004 | Willbert et al. ............. 507/200 |
| 2004/0138068 A1 | 7/2004 | Rimmer et al. ............. 507/100 |
| 2004/0149441 A1 | 8/2004 | Nguyen et al. ............ 166/280.1 |
| 2004/0152601 A1 | 8/2004 | Still et al. ................. 507/100 |
| 2004/0152602 A1 | 8/2004 | Boles |
| 2004/0177961 A1 | 9/2004 | Nguyen et al. |
| 2004/0194960 A1 | 10/2004 | DiLullo et al. |
| 2004/0194961 A1 | 10/2004 | Nguyen et al. |
| 2004/0206499 A1 | 10/2004 | Nguyen et al. ............ 166/280.2 |
| 2004/0211559 A1 | 10/2004 | Nguyen et al. .............. 166/276 |
| 2004/0211561 A1 | 10/2004 | Nguyen et al. ............ 166/280.2 |
| 2004/0221992 A1 | 11/2004 | Nguyen et al. .............. 166/295 |
| 2004/0231845 A1 | 11/2004 | Cooke, Jr. ................. 166/279 |
| 2004/0231847 A1 | 11/2004 | Nguyen et al. .............. 166/295 |
| 2004/0256097 A1 | 12/2004 | Byrd et al. |
| 2004/0256099 A1 | 12/2004 | Nguyen et al. |
| 2004/0261993 A1 | 12/2004 | Nguyen |
| 2004/0261995 A1 | 12/2004 | Nguyen et al. |
| 2004/0261997 A1 | 12/2004 | Nguyen et al. ............ 166/281 |
| 2004/0261999 A1 | 12/2004 | Nguyen |
| 2005/0000694 A1 | 1/2005 | Dalrymple et al. |
| 2005/0000731 A1 | 1/2005 | Nguyen et al. |
| 2005/0006093 A1 | 1/2005 | Nguyen et al. |
| 2005/0006095 A1 | 1/2005 | Justus et al. |
| 2005/0006096 A1 | 1/2005 | Nguyen et al. |
| 2005/0028976 A1 | 2/2005 | Nguyen |
| 2005/0028979 A1 | 2/2005 | Brannon et al. |
| 2005/0034862 A1 | 2/2005 | Nguyen ..................... 166/281 |
| 2005/0034865 A1 | 2/2005 | Todd et al. |
| 2005/0045326 A1 | 3/2005 | Nguyen |
| 2005/0045330 A1 | 3/2005 | Nguyen et al. |
| 2005/0045384 A1 | 3/2005 | Nguyen |
| 2005/0051331 A1 | 3/2005 | Nguyen et al. ............ 166/280.2 |
| 2005/0051332 A1 | 3/2005 | Nguyen et al. ............ 166/281 |
| 2005/0059555 A1 | 3/2005 | Dusterhoft et al. ......... 507/100 |
| 2005/0061509 A1 | 3/2005 | Nguyen ..................... 166/307 |
| 2005/0092489 A1 | 5/2005 | Welton et al. ............. 166/280.2 |
| 2005/0126780 A1 | 6/2005 | Todd et al. |
| 2005/0139359 A1 | 6/2005 | Maurer et al. |
| 2005/0145385 A1 | 7/2005 | Nguyen ..................... 166/279 |
| 2005/0173116 A1 | 8/2005 | Nguyen et al. ............ 166/280.2 |
| 2005/0178551 A1 | 8/2005 | Tolman et al. |
| 2005/0194135 A1 | 9/2005 | Nguyen et al. |
| 2005/0194136 A1 | 9/2005 | Nguyen et al. |
| 2005/0194140 A1 | 9/2005 | Dalrymple et al. |
| 2005/0194142 A1 | 9/2005 | Nguyen ..................... 166/280.2 |
| 2005/0197258 A1 | 9/2005 | Nguyen ..................... 507/209 |
| 2005/0207001 A1 | 9/2005 | Laufer et al. |
| 2005/0257929 A1 | 11/2005 | Nguyen et al. |
| 2005/0263283 A1 | 12/2005 | Nguyen ..................... 166/281 |
| 2005/0267001 A1 | 12/2005 | Weaver et al. |
| 2005/0269086 A1 | 12/2005 | Nguyen et al. ............ 166/281 |
| 2005/0269101 A1 | 12/2005 | Stegent et al. |
| 2005/0274510 A1 | 12/2005 | Nguyen et al. |
| 2005/0274517 A1 | 12/2005 | Blauch et al. |
| 2005/0274520 A1 | 12/2005 | Nguyen et al. |
| 2005/0277554 A1 | 12/2005 | Blauch et al. .............. 507/224 |
| 2005/0284632 A1 | 12/2005 | Dalrymple et al. |
| 2005/0284637 A1 | 12/2005 | Stegent et al. ............ 166/308.1 |
| 2006/0048943 A1 | 3/2006 | Parker et al. |
| 2006/0048944 A1 | 3/2006 | Van Batenburg et al. |
| 2006/0052251 A1 | 3/2006 | Anderson et al. |
| 2006/0089266 A1 | 4/2006 | Dusterhoft et al. |
| 2006/0012430 A1 | 6/2006 | Nguyen et al. |
| 2006/0113078 A1 | 6/2006 | Nguyen et al. |
| 2006/0124309 A1 | 6/2006 | Nguyen et al. |
| 2006/0137875 A1 | 6/2006 | Dusterhoft et al. |
| 2006/0157243 A1 | 7/2006 | Nguyen |
| 2006/0175058 A1 | 8/2006 | Nguyen |
| 2006/0219405 A1 | 10/2006 | Nguyen et al. |
| 2006/0219408 A1 | 10/2006 | Nguyen et al. |
| 2006/0234874 A1 | 10/2006 | Eoff et al. |
| 2006/0240994 A1 | 10/2006 | Eoff et al. |
| 2006/0240995 A1 | 10/2006 | Rickman et al. |
| 2006/0260810 A1 | 11/2006 | Weaver et al. |
| 2006/0260813 A1 | 11/2006 | Welton et al. |
| 2006/0264332 A1 | 11/2006 | Welton et al. |
| 2006/0266522 A1 | 11/2006 | Eoff et al. |
| 2006/0283592 A1 | 12/2006 | Sierra et al. |
| 2006/0289160 A1 | 12/2006 | van Batenburg et al. |
| 2007/0007010 A1 | 1/2007 | Welton et al. |
| 2007/0012445 A1 | 1/2007 | Nguyen et al. |
| 2007/0029087 A1 | 2/2007 | Nguyen et al. |
| 2007/0114032 A1 | 5/2007 | Stegent et al. |
| 2007/0131422 A1 | 6/2007 | Gatlin et al. |
| 2007/0131425 A1 | 6/2007 | Gatlin et al. |
| 2008/0006406 A1 | 1/2008 | Nguyen et al. |

FOREIGN PATENT DOCUMENTS

| | | |
|---|---|---|
| EP | 0313243 B1 | 10/1988 |
| EP | 0528595 A1 | 8/1992 |
| EP | 0506934 | 10/1992 |
| EP | 0510762 B1 | 11/1992 |
| EP | 0643196 A2 | 6/1994 |
| EP | 0834644 A2 | 4/1998 |
| EP | 0853186 A2 | 7/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1326003 A1 | 7/2003 |
| EP | 1362978 A1 | 11/2003 |
| EP | 1394355 A1 | 3/2004 |
| EP | 1396606 A2 | 3/2004 |
| EP | 1398460 A1 | 3/2004 |
| EP | 1403466 A2 | 3/2004 |
| EP | 1464789 A1 | 10/2004 |
| EP | 1607572 | 12/2005 |
| GB | 1107584 | 4/1965 |
| GB | 1264180 | 12/1969 |
| GB | 1292718 | 10/1972 |
| GB | 2298440 | 9/1996 |
| GB | 2382143 A | 4/2001 |
| WO | WO 93/15127 | 8/1993 |
| WO | WO 94/07949 | 4/1994 |
| WO | WO 94/08078 | 4/1994 |

| | | |
|---|---|---|
| WO | WO 94/08090 | 4/1994 |
| WO | WO 95/09879 | 4/1995 |
| WO | WO 97/11845 | 4/1997 |
| WO | WO 01/81914 | 11/2001 |
| WO | WO 01/87797 A1 | 11/2001 |
| WO | WO 02/12674 A1 | 2/2002 |
| WO | WO 03/027431 A2 | 4/2003 |
| WO | WO 03/027431 A3 | 4/2003 |
| WO | WO 2004/009956 | 1/2004 |
| WO | WO 2004/037946 A1 | 5/2004 |
| WO | WO 2004/038176 A1 | 5/2004 |
| WO | WO 2004/083600 | 9/2004 |
| WO | WO2004090281 | 10/2004 |
| WO | WO2004104368 | 12/2004 |
| WO | WO 2005/021928 A2 | 3/2005 |
| WO | WO2005080749 | 9/2005 |
| WO | WO2006103385 | 10/2006 |
| WO | WO2006116868 | 11/2006 |

OTHER PUBLICATIONS

U.S. Appl. No. 11/056,635, filed Feb. 11, 2005, Dusterhoft, et al.
Halliburton, *CoalStim$^{SM}$ Service, Helps Boost Cash Flow From CBM Assets*, Stimulation, HO3679 Oct. 2003, Halliburton Communications.
Halliburton, *Conductivity Endurance Technology for High Permeability Reservoirs, Helps Prevent Intrusion of Formation Material Into the Proppant Pack for Improved Long-term Production*, Stimulation, 2003, Halliburton Communications.
Halliburton, *Expedite® Service, A Step-Change Improvement Over Conventional Proppant Flowback Control Systems. Provides Up to Three Times the Conductivity of RCPs.*, Stimulation, HO3296 May 2004, Halliburton Communications.
Halliburton Technical Flier—Multi Stage Frac Completion Methods, 2 pages.
Halliburton "*CobraFrac$^{SM}$ Service, Coiled Tubing Fracturing—Cost-Effective Method for Stimulating Untapped Reserves*", 2 pages, 2004.
Halliburton "*CobraJetFrac$^{SM}$ Service, Cost-Effective Technology That Can Help Reduce Cost per BOE Produced, Shorten Cycle time and Reduce Capex*".
Halliburton Cobra Frac Advertisement, 2001.
Halliburton "*SurgiFrac$^{SM}$ Service, a Quick and cost-Effective Method to Help Boost Production From Openhole Horizonal Completions*", 2002.
Halliburton, *SandWedge® NT Conductivity Enhancement System, Enhances Proppant Pack Conductivity and Helps Prevent Intrusion of Formation Material for Improved Long-Term Production*, Stimulation, HO2289 May 2004, Halliburton Communications.
Almond et al., *Factors Affecting Proppant Flowback With Resin Coated Proppants*, SPE 30096, pp. 171-186, May 1995.
Nguyen et al., *A Novel Approach For Enhancing Proppant Consolidation: Laboratory Testing and Field Applications*, SPE Paper No. 77748, 2002.
SPE 15547, *Field Application of Lignosulfonate Gels to Reduce Channeling*, South Swan Hills Miscible Unit, Alberta, Canada, by O.R. Wagner et al., 1986.
Owens et al., *Waterflood Pressure Pulsing for Fractured Reservoirs* SPE 1123, 1966.
Felsenthal et al., *Pressure Pulsing—An Improved Method of Waterflooding Fractured Reservoirs* SPE 1788, 1957.
Raza, "*Water and Gas Cyclic Pulsing Method for Improved Oil Recovery*", SPE 3005, 1971.
Peng et al., "*Pressure Pulsing Waterflooding in Dual Porosity Naturally Fractured Reservoirs*" SPE 17587, 1988.
Dusseault et al, "*Pressure Pulse Workovers in Heavy Oil*", SPE 79033, 2002.
Yang et al., "*Experimental Study on Fracture Initiation By Pressure Pulse*", SPE 63035, 2000.
Nguyen et al., *New Guidelines for Applying Curable Resin-Coated Proppants*, SPE Paper No. 39582, 1997.
Kazakov et al., "*Optimizing and Managing Coiled Tubing Frac Strings*" SPE 60747, 2000.
Advances in Polymer Science, vol. 157, "*Degradable Aliphatic Polyesters*" edited by A.-C. Alberston, pp. 1-138, 2001.
Gorman, *Plastic Electric: Lining up the Future of Conducting Polymers* Science News, vol. 163, May 17, 2003.
Gidley et al., "*Recent Advances in Hydraulic Fracturing*," Chapter 6, pp. 109-130, 1989.
Simmons et al., "*Poly(phenyllactide): Synthesis, Characterization, and Hydrolytic Degradation, Biomacromolecules*", vol. 2, No. 2, pp. 658-663, 2001.
Yin et al., "*Preparation and Characterization of Substituted Polylactides*", Americal Chemical Society, vol. 32, No. 23, pp. 7711-7718, 1999.
Yin et al., "*Synthesis and Properties of Polymers Derived from Substituted Lactic Acids*", American Chemical Society, Ch.12, pp. 147-159, 2001.
Cantu et al., "*Laboratory and Field Evaluation of a Combined Fluid-Loss Control Additive and Gel Breaker for Fracturing Fluids*," SPE 18211, 1990.
Love et al., "*Selectively Placing Many Fractures in Openhole Horizontal Wells Improves Production*", SPE 50422, 1998.
McDaniel et al. "*Evolving New Stimulation Process Proves Highly Effective in Level 1 Dual-Lateral Completion*" SPE 78697, 2002.
Dechy-Cabaret et al., "*Controlled Ring-Operated Polymerization of Lactide and Glycolide*" American Chemical Society, Chemical Reviews, A-Z, AA-AD, 2004.
Funkhouser et al., "*Synthetic Polymer Fracturing Fluid for High-Temperature Applications*", SPE 80236, 2003.
*Chelating Agents*, Encyclopedia of Chemical Technology, vol. 5 (764-795).
Vichaibun et al., "*A New Assay for the Enzymatic Degradation of Polylactic Acid, Short Report*", ScienceAsia, vol. 29, pp. 297-300, 2003.
CDX Gas, CDX Solution, 2003, CDX, LLC, Available @ www.cdxgas.com/solution.html, printed pp. 1-2.
CDX Gas, "*What is Coalbed Methane?*" CDX, LLC. Available @ www.cdxgas.com/what.html, printed p. 1.
Halliburton brochure entitled "Pillar Frac Stimulation Technique" Fracturing Services Technical Data Sheet, 2 pages.
U.S. Appl. No. 12/080,647, filed Apr. 4, 2008, Dalrymple et al.
"Santrol Bioballs"; http://www.fairmounminerals.com/.sub.—SANTROL/SANTROL%20Web%20Site/B.sub- .—TD.htm. Sep. 30, 2004.
International Search Report and Opinion (PCT/GB2004/002412), Sep. 16, 2004.
International Search Report and Opinion (PCT/GB2005/003845), Jul. 31, 2006.
International Search Report and Opinion (PCT/GB2005/004009), Jan. 11, 2006.
International Search Report (CPW 21582 EP), Mar. 11, 2005.
International Search Report and Opinion (PCT/GB2004/001497), Jul. 20, 2004.
International Search Report and Opinion (PCT/GB2004/001842), Oct. 12, 2004.
International Search Report and Opinion (PCT/GB2004/002674), Dec. 16, 2004.
International Search Report and Opinion (PCT/GB2004/002968), Nov. 16, 2004.
International Search Report and Opinion (PCT/GB2004/004242), Feb. 10, 2005.
International Search Report and Opinion (PCT/GB2004-000689), Jun. 4, 2004.
International Search Report and Opinion (PCT/GB2004/002727), Mar. 11, 2005.
International Search Report and Opinion (PCT/GB2004/002747), Mar. 11, 2005.
International Search Report and Opinion (PCT/GB2005/004010), Feb. 21, 2006.
International Search Report and Opinion (PCT/GB2006/004102), Feb. 20, 2007.
International Search Report and Opinion (PCT/GB2006/004137), Jun. 5, 2008.
International Search Report and Opinion (PCT/GB2006/004852), Mar. 7, 2007.
International Search Report and Opinion (PCT/GB2007/000467), Jun. 15, 2007.

International Search Report and Opinion (PCT/GB2006/000366), Jun. 22, 2006.
International Search Report and Opinion (PCT/GB2005/003747), Dec. 12, 2005.
International Search Report and Opinion (PCT/GB2007/000421), May 10, 2007.
International Search Report and Opinion (PCT/GB2007/002273), Sep. 3, 2007.
International Search Report and Opinion (PCT/GB2004/002948), May 24, 2005.
International Search Report and Opinion (PCT/GB2005/000637), Jun. 2, 2005.
International Search Report and Opinion (PCT/GB2005/000634), Jun. 8, 2005.
International Preliminary Report on Patenability (PCT/GB2005/000634), Sep. 14, 2006.
Paccaloni, et al., "Key Factors for Enhanced Results of Matrix Stimulation Treatments," SPE 17154, Feb. 1988.
Paccaloni, et al., "Advances in Matrix Stimulation Technology," SPE 20623, Mar. 1993.
Nguyen, et al., Controlling Proppant Flowback in High-Temperature, High-Production Wells, SPE 82215, May 2003.
Dusterhoft, et al., Maximizing Effective Proppant Permeability Under High-Stress, High Gas-Rate Conditions, SPE 90398, Sep. 2004.
Notice of allowance from U.S. Appl. No. 10/791,944, filed Mar. 8, 2007.
Office action dated from U.S. Appl. No. 10/791,944, filed Oct. 19, 2006.

* cited by examiner

RESIN COMPOSITIONS AND METHODS OF USING SUCH RESIN COMPOSITIONS IN SUBTERRANEAN APPLICATIONS

This application is a divisional of application Ser. No. 10/791,944 filed on Mar. 3, 2004, issued as U.S. Pat. No. 7,211,547.

BACKGROUND

The present invention relates to resin compositions and methods of using such compositions in subterranean formations. More particularly, the present invention relates to curable, permeable resin compositions and methods of using such compositions, for example, to control particulate migration.

Hydrocarbon wells are often located in subterranean zones that contain unconsolidated particulates that may migrate out of the subterranean formation with the oil, gas, water, and/or other fluids produced by the wells. The presence of particulates, such as formation sand, in produced fluids is undesirable in that the particulates may abrade pumping and other producing equipment and reduce the fluid production capabilities of the producing zones. Unconsolidated subterranean zones include those that contain loose particulates, those wherein the bonded particulates have insufficient bond strength to withstand the forces produced by the production of fluids through the zones.

One method of controlling particulates in unconsolidated formations involves placing a filtration bed containing gravel near the well bore in order to present a physical barrier to the transport of unconsolidated formation fines with the production of hydrocarbons. Typically, such so-called "gravel packing operations" involve the pumping and placement of a quantity of a desired particulate into the unconsolidated formation in an area adjacent to a well bore. Such packs may be time consuming and expensive to install.

Another method used to control particulates in unconsolidated formations involves consolidating unconsolidated subterranean producing zones by applying a resin followed by a spacer fluid and then a catalyst. Such techniques, however, may be problematic when, for example, an insufficient amount of spacer fluid is used between the application of the resin and the application of the external catalyst. The resin may come into contact with the external catalyst in the well bore itself rather than in the unconsolidated subterranean producing zone, which may result in rapid polymerization, potentially damaging the formation by plugging the pore channels, halting pumping when the well bore is plugged with solid material, or resulting in a down hole explosion as a result of the exothermic heat generated by the polymerization. Also, using these conventional processes to treat long intervals of unconsolidated regions is not practical due to the difficulty in determining if the entire interval has been successfully treated with both the resin and the external catalyst.

SUMMARY OF THE INVENTION

The present invention relates to resin compositions and methods of using such compositions in subterranean formations. More particularly, the present invention relates to curable, permeable resin compositions and methods of using such compositions, for example, to control particulate migration.

One embodiment of the present invention provides a method of creating a resin mass comprising the steps of combining a resin, a hardening agent, a hydrocarbon diluent, a silane coupling agent, a foaming agent, a compressible gas, and a degradable material to form a resin composition; placing the resin composition in a subterranean formation; and, allowing the resin to substantially cure and the degradable material to substantially degrade so as to form a permeable, hardened resin mass.

Another embodiment of the present invention provides a method of controlling the migration of particulates in a subterranean formation comprising the steps of isolating a zone in a subterranean formation; providing a resin composition comprising a resin, a hardening agent, a hydrocarbon diluent, a silane coupling agent, a foaming agent, a compressible gas, and a degradable material; placing the resin composition in at least a portion of the zone; and, allowing the resin to substantially cure and the degradable material to substantially degrade so as to form a permeable, hardened resin mass.

Another embodiment of the present invention provides a method of at least partially maintaining the integrity of a subterranean fracture comprising the steps of providing a resin composition comprising resin, a hardening agent, a hydrocarbon diluent, a silane coupling agent, a foaming agent, a compressible gas, and a degradable material; placing the resin composition into at least one fracture in a subterranean formation; and, allowing the resin to substantially cure and the degradable material to substantially degrade so as to form a permeable, hardened resin mass.

Another embodiment of the present invention provides a resin composition useful in subterranean applications comprising a resin, a hardening agent, a hydrocarbon diluent, a silane coupling agent, a foaming agent, a compressible gas, and a degradable material.

The features and advantages of the present invention will be readily apparent to those skilled in the art upon a reading of the description of the preferred embodiments that follows.

DESCRIPTION OF PREFERRED EMBODIMENTS

The present invention relates to resin compositions and methods of using such compositions in subterranean formations. More particularly, the present invention relates to curable, permeable resin compositions and methods of using such compositions, for example, to control particulate migration.

The resin compositions of the present invention comprise an epoxy resin; a hardening agent; a hydrocarbon diluent; a silane coupling agent; a foaming agent; a compressible gas; and, a degradable material. The resin compositions of the present invention may further comprise an optional filler material. Such resin compositions are capable of being placed in a zone of a subterranean formation, such as a fracture or a well bore, so as to form hardened, permeable masses capable of controlling particulate migration while not negatively impacting the production of desirable fluids. When a resin composition of the present invention is placed in or neighboring the desired zone, the resin hardens and the void spaces left by the compressible gas are further augmented when the degradable material degrades and creates additional voids within the hardened resin mass. These voids enhance the permeability of the hardened resin, which results, inter alia, in enhanced mass conductivity that may enhance well productivity. The resin compositions of the present invention provide the ability to form an in-situ porous medium capable of controlling formation fines and sands while allowing hydrocarbon production.

Resins suitable for use in the present invention are those resins that are capable of forming a hardened, consolidated mass. Suitable resins include, but are not limited to phenolic resins, furan/furfuryl alcohol resins, phenolic/latex resins, phenol formaldehyde resins, polyester resins and hybrids and copolymers thereof, polyurethane resins and hybrids and copolymers thereof, acrylate reins, and mixtures thereof. Preferred types of resin are epoxy resin systems. Epoxy resin systems generally contain an internal catalyst or activator so that when pumped down hole, they may be cured using only time and temperature where desired. The furan resin systems generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention.

The resin compositions of the present invention further comprise a hardening agent. Suitable hardening agents are those materials capable of aiding the selected resin to form a consolidated mass. Examples of the hardening agents that can be used include, but are not limited to, amines, aromatic amines, polyamines, aliphatic amines, cyclo-aliphatic amines, amides, polyamides, 2-ethyl-4-methyl imidazole, 1,1,3-trichlorotrifluoroacetone, and combinations thereof. Selection of a suitable hardening agent depends, in part, on the resin chosen and the temperature of the formation in which the hardening agent will be used. By way of example and not of limitation, in subterranean formations having a temperature from about 60° F. to about 250° F., amines and cyclo-aliphatic amines such as piperidine, triethylamine, N,N-dimethylaminopyridine, benzyldimethylamine, tris (dimethylaminomethyl)phenol, and 2-($N_2$N-dimethylaminomethyl)phenol are preferred with N,N-dimethylaminopyridine most preferred. In subterranean formations having higher temperatures, 4,4'-diaminodiphenyl sulfone may be a suitable hardening agent. In some embodiments of the present invention, the hardening agent used may be included in the resin composition in the range of from about 40% to about 60% by weight of the resin in the resin composition.

The resin compositions of the present invention further comprise a hydrocarbon diluent containing one or more aromatic hydrocarbons. Suitable hydrocarbon diluents, inter alia, act to dilute the viscosity of the resin and such diluents are often chosen based on availability and cost concerns. Examples of suitable aromatic hydrocarbon diluents include, but are not limited to, toluene, ethylbenzene, n-propylbenzene; isopropylbenzene, n-butylbenzene, isobutylbenzene, cyclohexylbenzene, n-hexylbenzene, xylene, diethylbenzene, 2-chloro-p-xylene diisopropylbenzene, 2-nitro-p-xylene, cymene, durene, isodurene, trimethylbenzene, triethylbenzene, dibutylbenzene, penta-methylbenzene, 1-pentyl-3-ethylbenzene, p-pentyltoluene, 1-hexyl-3-isobutylbenzene, m-hexyltoluene, 1-heptyl-3-isopropylbenzene, p-heptyltoluene, 1-heptyl-3-ethylbenzene, 1-octyl-3-butylbenzene, 1-octyl-3-propylbenzene, p-octyltoluene, 1-nonyl-3-ethylbenzene, p-nonyltoluene, 1-dodecyl-3-ethylbenzene, p-isodecyltoluene, 1-decyl-3-isotridecylbenzene, and mixtures thereof. In some embodiments of the present invention, the hydrocarbon diluent is included in the resin composition in the range of from about 20% to about 60% by weight of the resin in the resin composition. It is within the ability of one skilled in the art, with the benefit of this disclosure, to select a suitable diluent and a suitable percentage of diluent.

The resin compositions of the present invention further comprise a silane coupling agent that acts to help the resin bond to the degradable material (and filler, where used) in the resin composition. Examples of silane coupling agents that can be used in the resin compositions of the present invention include, but are not limited to, N-2-(aminoethyl)-3-aminopropyltrimethoxysilane, 3-glycidoxypropyltrimethoxysilane, n-beta-(aminoethyl)-gamma-aminopropyl trimethoxysilane, and combinations thereof. The silane coupling agent chosen is included in the liquid hardening agent component in an amount capable of sufficiently bonding the resin to a particulate. In some embodiments of the present invention, the silane coupling agent used is included in the resin composition in the range of from about 0.01% to about 5% by weight of the resin in the resin composition.

The resin compositions of the present invention further comprise a foaming agent that comprises a fluorocarbon surfactant. Traditional foaming agents are incompatible with the resin component of the resin compositions of the present invention. However, it has been found that foaming agents comprising a fluorocarbon surfactant are suitable for forming a stable foam in the resin compositions of the present invention. Examples of suitable foaming agents comprising fluorocarbon surfactants include, but are not limited to, fluorinated alkyl alkoxylates, fluorinated alkyl esters, fluorinated aliphatic polymeric esters, and combinations thereof. Examples of suitable, commercially available foaming agents comprising a fluorocarbon surfactant include those sold by 3M Company of St. Paul, Minn. under the trade names "FC-730™," "FC-4430™," and "FC-4432™." In some embodiments of the present invention, the foaming agent is included in the resin composition in the range of from about 0.01% to about 5% by weight of the resin in the resin composition.

The resin compositions of the present invention further comprise a compressible gas. Any compressible gas that does not adversely react with or affect the other components of the resin composition may be used in accordance with the present invention. Suitable compressible gases include air, nitrogen, and combinations thereof. Carbon dioxide may be contraindicated based on the resin type selected. For example, where an epoxy resin is used, the acidity of a carbon dioxide compressible gas may prevent adequate curing of the resin. Similarly, where a furan resin is chosen, the acidity of the carbon dioxide may cause premature curing and potential safety concerns. One of ordinary skill in the art, with the benefit of this disclosure, will recognize situations wherein carbon dioxide is contraindicated. In some embodiments of the present invention, the compressible gas is included in the resin composition in an amount sufficient to produce a final resin composition density from about 6 to about 12 pounds per gallon (including filler material).

The resin compositions of the present invention further comprise a degradable material capable of undergoing an irreversible degradation down hole. In some embodiments of the present invention, the degradable material is included in the resin composition in the range of from about 1% to about 60% by weight of the resin in the resin composition. The amount of degradable material used should not be such that, when degraded, an undesirably high percentage of voids are present in the resin mass that potentially could make the resin mass too weak to maintain its character or allow the resin mass to crumble or degrade. One of ordinary skill in the art, with the benefit of this disclosure, will recognize an optimum concentration and shape of a degradable material that provides desirable values in terms of enhanced conductivity or permeability without undermining the stability of the resin mass itself.

The term "irreversible" as used herein means that the degradable material once degraded down hole, it should not recrystallize or reconsolidate while down hole, e.g., the degradable material should degrade in situ but should not recrystallize or reconsolidate in situ. The terms "degradation" or "degradable" refer to both the two relatively extreme cases of hydrolytic degradation that the degradable material may undergo, i.e., heterogeneous (or bulk erosion) and homogeneous (or surface erosion), and any stage of degradation in between these two. This degradation can be a result of, inter alia, a chemical, thermal, radiation induced reaction.

Examples of degradable materials that may be used in conjunction with the present invention include but are not limited to materials that undergo hydrolysis in the presence of water (such as degradable polymers and dehydrated salts) and materials that degrade when subjected to the subterranean temperatures where the resin is being used (such as sodium acetate trihydrate). One of ordinary skill in the art with the benefit of this disclosure will be able to determine the appropriate degradable material to achieve the desired degradation time, result in the desired degradation by-products, and the like.

Suitable examples of degradable polymers that may be used in accordance with the present invention, include, but are not limited to, those described in the publication of Advances in Polymer Science, Vol. 157 entitled "Degradable Aliphatic Polyesters" edited by A.-C. Albertsson. Specific examples of suitable polymers include polysaccharides; chitins; chitosans; proteins; aliphatic polyesters; poly(lactides); poly(glycolides); poly(ε-caprolactones); poly(hydroxybutyrates); poly(anhydrides); aliphatic polycarbonates; poly(orthoesters); poly(amino acids); poly(ethylene oxides); polyphosphazenes; polyvinyl alcohols; poly ethylene oxides; poly(adipic anhydrides), poly(suberic anhydrides), poly(sebacic anhydrides), poly(dodecanedioic anhydrides), poly(maleic anhydrides), poly(benzoic anhydrides); and combinations thereof. Poly(lactides) are preferred degradable polymers for the compositions and methods of the present invention.

Suitable examples of dehydrated salts that may be used in conjunction with the present invention include, but are not limited to, particulate solid anhydrous borate materials. Specific examples of particulate solid anhydrous borate materials that may be used include but are not limited to anhydrous sodium tetraborate (also known as anhydrous borax), and anhydrous boric acid. Such anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the subterranean zone in which they are placed.

Blends of degradable materials also are suitable for use in the present invention. One example of a suitable blend of materials is a mixture of poly(lactic acid) and sodium borate where the mixing of an acid and base could result in a neutral solution where this is desirable. Another example would include a blend of poly(lactic acid) and boric oxide.

In choosing the appropriate degradable material, one should consider the degradation products that will result. These degradation products should not adversely affect other operations or components. The choice of degradable material also can depend, at least in part, on the conditions of the well, e.g., well bore temperature. For instance, lactides have been found to be suitable for lower temperature wells, including those within the range of 60° F. to 150° F., and poly(lactides) have been found to be suitable for well bore temperatures above this range. Also, poly(lactic acid) may be suitable for higher temperature wells. Some stereoisomers of poly(lactide) or mixtures of such stereoisomers may be suitable for even higher temperature applications. Dehydrated salts may also be suitable for higher temperature wells.

A preferable result is achieved if the degradable material degrades slowly over time as opposed to instantaneously. Even more preferable results have been obtained when the degradable material does not begin to degrade until after the resin composition has substantially cured. The slow degradation of the degradable material, inter alia, helps to maintain the stability of the cured resin mass. In preferred embodiments, the degradable material does not degrade from or out of the resin mass until the resin is at least about 90% cured.

The specific features of the degradable material may be chosen or modified to provide the consolidated resin mass with optimum conductivity while maintaining its desirable filtering capability. The physical shape of the degradable material should be chosen so as to enhance the desired shape and relative composition of the resultant voids within the resin mass so as to provide the cured resin mass with optimum permeability and conductivity characteristics. For example, a rod-like particle shape may be suitable in applications wherein channel-like voids in the final resin mass are desired. One of ordinary skill in the art, with the benefit of this disclosure, will recognize the specific degradable material and the preferred size and shape for a given application. Preferably, the degradable material is substantially evenly dispersed throughout the resin composition.

The resin compositions of the present invention optionally may comprise a particulate filler material. The filler material may be used as a low cost additive to increase the total volume of the resin composition. The filler material may be chosen to add compressive strength, to achieve a desired density, to provide a cost savings, or all of the above. Fillers chosen for strength may be particularly useful in situations in which the resin compositions of the present invention are used to fill subterranean fractures and must be able to withstand closure stress once the formation is placed on production. Any particulate suitable for use in subterranean applications is suitable for use as the filler in the compositions and methods of the present invention. For instance, sand, nut hulls, bauxite, ceramics, polymeric materials, fly ash, bottom ash, a combination thereof, or the like are suitable. Suitable sizes range from 6 to 325 U.S. mesh. In some embodiments of the present invention, the filler material may be included in the resin composition in the range of from about 1% to about 100% by weight of the other components in the resin composition. The filler material is preferably included in the resin composition in the range of from about 60% to about 80% by weight of the other components in the resin composition. When used, in preferred embodiments, the filler material should be substantially evenly dispersed throughout the resin composition before it is placed into the subterranean formation.

Some embodiments of the present invention provide methods of creating resin compositions comprising the step of combining a resin, a hardening agent, a hydrocarbon diluent, a silane coupling agent, a foaming agent, a compressible gas, and a degradable material to form a substantially uniform mixture.

Other embodiments of the present invention provide methods of controlling the migration of particulates in a subterranean formation comprising the steps of isolating an interval in a subterranean formation; providing a resin composition comprising a resin, a hardening agent, a hydrocarbon diluent, a silane coupling agent, a foaming agent, a compressible gas, and a degradable material; placing the resin composition in or neighboring to at least a portion of the isolated interval; and, allowing the resin to substantially cure and the degradable material to substantially degrade so as to form a permeable, hardened resin mass.

Still other embodiments of the present invention provide methods of at least partially maintaining the integrity of a subterranean fracture comprising the steps of providing a resin composition comprising resin, a hardening agent, a hydrocarbon diluent, a silane coupling agent, a foaming agent, a compressible gas, and a degradable material; placing the resin composition into at least one fracture in a subterranean formation; and, allowing the resin to substantially cure and the degradable material to substantially degrade so as to form a permeable, hardened resin mass.

Thus, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A resin composition useful in subterranean applications comprising a resin, a hardening agent, a hydrocarbon diluent, a silane coupling agent, a foaming agent, a compressible gas, and a hydrolytically degradable material.

2. The resin composition of claim 1 wherein the hydrocarbon diluent comprises one or more aromatic hydrocarbons.

3. The resin composition of claim 2 wherein the hydrocarbon diluent is selected from the group consisting of toluene, ethylbenzene, n-propylbenzene; isopropylbenzene, n-butylbenzene, isobutylbenzene, cyclohexylbenzene, n-hexylbenzene, xylene, diethylbenzene, 2-chloro-p-xylene, diisopropylbenzene, 2-nitro-p-xylene, cymene, durene, isodurene, trimethylbenzene, triethylbenzene, dibutylbenzene, pentamethylbenzene, 1-pentyl-3-ethylbenzene, p-pentyltoluene, 1-hexyl-3-isobutylbenzene, m-hexyltoluene, 1-heptyl-3-isopropylbenzene, p-heptyltoluene, 1-heptyl-3-ethylbenzene, 1-octyl-3-butylbenzene, 1-octyl-3-propylbenzene, p-octyltoluene, 1-nonyl-3-ethylbenzene, p-nonyltoluene, 1-dodecyl-3-ethylbenzene, p-isodecyltoluene, 1-decyl-3-isotridecylbenzene, and combinations thereof.

4. The resin composition of claim 1 wherein the foaming agent comprises a fluorocarbon surfactant.

5. The resin composition of claim 4 wherein the foaming agent is selected from the group consisting of a fluorinated alkyl alkoxylate, a fluorinated alkyl ester, a fluorinated aliphatic polymeric ester, and a combination thereof.

6. The resin composition of claim 1 wherein the hydrolytically degradable material is selected from the group consisting of a hydrolytically degradable polymer, a dehydrated salt, and a combination thereof.

7. The resin composition of claim 6 wherein the hydrolytically degradable polymer is selected from the group consisting of a chitin; a chitosan; a protein; an aliphatic polyester; a poly(lactide); a poly(glycolide); a poly(ε-caprolactone); a poly(hydroxybutyrate); a poly(anhydride); an aliphatic polycarbonate; a poly(orthoester); a poly(amino acid); a poly (ethylene oxide); a polyphosphazene; a polyvinyl alcohol; a poly ethylene oxide; a poly(adipic anhydride), a poly(suberic anhydride), a poly(sebacic anhydride), a poly(dodecanedioic anhydride), a poly(maleic anhydride), a poly(benzoic anhydride); and a combination thereof.

8. The resin composition of claim 6 wherein the dehydrated salt comprises a particulate solid anhydrous borate material.

9. The resin composition of claim 1 further comprising a filler material.

10. The resin composition of claim 9 wherein the filler material is selected from the group consisting of sand, nut hulls, bauxite, ceramics, polymeric materials, fly ash, bottom ash, and a combination thereof.

11. The resin composition of claim 9 wherein the filler comprises from about 1% to about 60% of the resin composition by weight of the resin therein.

12. The resin composition of claim 1 wherein the resin is selected from the group consisting of a phenolic resin, a furan/furfuryl alcohol resin, a phenolic/latex resin, a phenol formaldehyde resin, a polyester resin; a hybrid polyester resin; a copolymer polyester resin; a polyurethane resin; a hybrid polyurethane resin; a copolymer polyurethane resin, an acrylate resin, and a combination thereof.

13. The resin composition of claim 1 wherein the resin comprises an epoxy resin.

14. The resin composition of claim 1 wherein the resin comprises a furan resin.

15. The resin composition of claim 1 wherein the hardening agent is selected from the group consisting of an amine, an aromatic amine, a polyamine, an aliphatic amine, a cycloaliphatic amine, an amide, a polyamide, 2-ethyl-4-methyl imidazole, 1,1,3-trichlorotrifluoroacetone, and a combination thereof.

16. The resin composition of claim 1 wherein the hardening agent comprises from about 40% to about 60% of the resin composition by weight of the resin therein.

17. The resin composition of claim 1 wherein the hydrocarbon diluent comprises from about 40% to about 60% of the resin composition by weight of the resin therein.

18. The resin composition of claim 1 wherein the silane coupling agent is selected from the group consisting of N-2-(aminoethyl)-3-aminopropyltrimethoxysilane, 3-glycidoxypropyltrimethoxysilane, n-beta-(aminoethyl)-gamma-aminopropyl trimethoxysilane, and a combination thereof.

19. The resin composition of claim 1 wherein the silane coupling agent comprises from about 0.01% to about 5% of the resin composition by weight of the resin therein.

20. The resin composition of claim 1 wherein the foaming agent comprises from about 0.01% to about 5% of the resin composition by weight of the resin therein.

21. The resin composition of claim 1 wherein the compressible gas is selected from the group consisting of air, nitrogen, and a combination thereof.

22. The resin composition of claim 1 wherein the compressible gas comprises is included in the resin composition in an amount sufficient to produce a final resin composition density from about 6 to about 12 pounds per gallon.

23. The resin composition of claim 1 wherein the hydrolytically degradable material comprises from about 1% to about 60% of the resin composition by weight of the resin therein.

* * * * *